US010445487B2

(12) United States Patent
Hon et al.

(10) Patent No.: US 10,445,487 B2
(45) Date of Patent: Oct. 15, 2019

(54) METHODS AND APPARATUS FOR AUTHENTICATION OF JOINT ACCOUNT LOGIN

(71) Applicant: Singou Technology (Macau) Ltd., Macau (CN)

(72) Inventors: Chi Tin Hon, Macau (CN); Chan Heng Tam, Macau (CN); Tai-Hua Ma, Macau (CN)

(73) Assignee: SINGOU TECHNOLOGY (MACAU) LTD., Macau (CN)

( * ) Notice: Subject to any disclaimer, the term of this patent is extended or adjusted under 35 U.S.C. 154(b) by 125 days.

(21) Appl. No.: 15/654,741

(22) Filed: Jul. 20, 2017

(65) Prior Publication Data
US 2019/0026456 A1   Jan. 24, 2019

(51) Int. Cl.
*H04L 29/06* (2006.01)
*G06F 21/40* (2013.01)
(Continued)

(52) U.S. Cl.
CPC .............. *G06F 21/40* (2013.01); *G06F 21/31* (2013.01); *G06F 21/44* (2013.01); *H04L 63/08* (2013.01);
(Continued)

(58) Field of Classification Search
CPC ..... H04L 63/18; H04L 63/0853; H04L 63/08; H04L 63/083; H04L 63/107; H04L 63/102; H04L 63/0492; H04L 2463/082; H04L 9/085; H04L 9/3215; H04L 9/0894; H04W 12/06; H04W 4/02; G06F 21/31; G06F 21/36; G06F 21/40; G06F 21/34; G06F 21/42; G06F 16/9554
See application file for complete search history.

(56) References Cited

U.S. PATENT DOCUMENTS 7,954,698 B1 * 6/2011 Pliha ...................... G06Q 40/02
                                                                235/379
8,256,664 B1 * 9/2012 Balfanz .................. H04L 63/08
                                                                235/375
(Continued)

OTHER PUBLICATIONS

Chuang, Jun-Chou, Yu-Chen Hu, and Hsien-Ju Ko. "A novel secret sharing technique using QR code." International Journal of Image Processing 4.5 (2010): 468-475. (Year: 2010).*
(Continued)

*Primary Examiner* — Michael Simitoski
(74) *Attorney, Agent, or Firm* — Eagle IP Limited; Jacqueline C. Lui

(57) ABSTRACT

A method improves authentication of a user to login with a client device to a computer system. A mobile device reads an authentication code displayed on a display of the client device to extract a URL and a first session identifier (ID), searches a first account profile that includes a username and a first part password associated with the URL, transmits the first session ID and the first account profile to the gateway server, prompts a second mobile device to provide a second part password associated with the username to the gateway server to form a complete password, and authenticates the user to login to the computer system with the client device when the client device retrieves from the gateway server the username and the complete password.

15 Claims, 8 Drawing Sheets

(51) Int. Cl.
  *G06F 21/31* (2013.01)
  *H04W 12/06* (2009.01)
  *G06F 21/44* (2013.01)
  *H04L 12/08* (2006.01)

(52) U.S. Cl.
  CPC ........ *H04L 63/0853* (2013.01); *H04L 63/102* (2013.01); *H04W 12/06* (2013.01); *H04L 2463/082* (2013.01)

(56) References Cited

U.S. PATENT DOCUMENTS

| | | | | |
|---|---|---|---|---|
| 8,474,028 B2* | 6/2013 | Kulkarni | ................ | H04L 63/08 380/229 |
| 8,839,386 B2* | 9/2014 | Gilboy | .................... | H04L 63/08 726/7 |
| 8,984,640 B1* | 3/2015 | Emigh | ................ | H04L 63/1441 726/25 |
| 9,756,056 B2* | 9/2017 | Churyumov | ............ | G06F 21/43 |
| 9,848,324 B1* | 12/2017 | Abene | ..................... | G06F 21/35 |
| 9,954,846 B2* | 4/2018 | Butterfield | ............. | H04L 63/08 |
| 2004/0019807 A1* | 1/2004 | Freund | ................ | H04L 63/0227 726/1 |
| 2006/0156012 A1* | 7/2006 | Beeson | ................ | H04L 9/3226 713/180 |
| 2006/0253584 A1* | 11/2006 | Dixon | .................... | G06Q 30/02 709/225 |
| 2008/0022384 A1* | 1/2008 | Yee | .................... | H04L 63/0263 726/11 |
| 2008/0060062 A1* | 3/2008 | Lord | ........................ | G06F 21/33 726/5 |
| 2008/0072049 A1* | 3/2008 | Cross | .................... | G06F 21/51 713/176 |
| 2008/0086764 A1* | 4/2008 | Kulkarni | ................ | G06F 21/33 726/7 |
| 2008/0086767 A1* | 4/2008 | Kulkarni | ................ | H04L 63/08 726/9 |
| 2008/0201576 A1* | 8/2008 | Kitagawa | ................ | H04L 63/08 713/168 |
| 2010/0218241 A1* | 8/2010 | Faryna | .................... | G06F 21/35 726/5 |
| 2010/0306542 A1* | 12/2010 | Funk | .................... | H04L 9/0822 713/171 |
| 2011/0270751 A1* | 11/2011 | Csinger | .................... | G06F 21/40 705/42 |
| 2012/0158626 A1* | 6/2012 | Zhu | ........................ | G06F 21/56 706/13 |
| 2013/0159195 A1* | 6/2013 | Kirillin | ................ | G06Q 20/322 705/71 |
| 2013/0185210 A1* | 7/2013 | Dodson | .................. | H04L 63/08 705/44 |
| 2013/0269013 A1* | 10/2013 | Parry | .................. | H04L 63/0861 726/7 |
| 2014/0040628 A1* | 2/2014 | Fort | ........................ | G06F 21/34 713/182 |
| 2014/0041003 A1* | 2/2014 | Wappenschmidt | ... | H04L 63/083 726/7 |
| 2014/0047519 A1* | 2/2014 | Faryna | .................... | G06F 21/35 726/5 |
| 2014/0223175 A1* | 8/2014 | Bhatnagar | ................ | G09C 5/00 713/159 |
| 2014/0282961 A1* | 9/2014 | Dorfman | ............. | H04L 63/0823 726/7 |
| 2014/0316991 A1* | 10/2014 | Moshal | .................. | G06Q 20/14 705/64 |
| 2015/0007259 A1* | 1/2015 | Peterson | .................. | G06F 21/54 726/1 |
| 2015/0261948 A1* | 9/2015 | Marra | .................... | G06F 21/34 726/4 |
| 2015/0281229 A1* | 10/2015 | Kang | .................. | H04L 63/0853 713/185 |
| 2015/0312759 A1* | 10/2015 | Kim | ........................ | G06F 21/10 455/411 |
| 2016/0183164 A1* | 6/2016 | Pelkey | .................... | H04L 63/20 455/456.1 |
| 2016/0191506 A1* | 6/2016 | Wang | .................. | H04L 63/0853 726/7 |
| 2016/0269181 A1* | 9/2016 | Hon | .................. | H04L 9/3226 |
| 2016/0286396 A1* | 9/2016 | Tuukkanen | ............. | G06F 21/40 |
| 2016/0308678 A1* | 10/2016 | Bhatnagar | ................ | G09C 5/00 |
| 2016/0323290 A1* | 11/2016 | Stead | ................ | H04L 63/0838 |
| 2017/0046665 A1* | 2/2017 | Sheehan | ................ | G06Q 20/10 |
| 2017/0061432 A1* | 3/2017 | Ekambaram | ......... | G06Q 20/405 |
| 2017/0064548 A1* | 3/2017 | Wappenschmidt | ......................... | H04L 63/0492 |
| 2017/0163623 A1* | 6/2017 | Fouad | .................... | H04L 63/083 |
| 2017/0244683 A1* | 8/2017 | Mohamed | ............... | H04L 63/18 |
| 2017/0289806 A1* | 10/2017 | Girdhar | .................. | H04W 4/70 |
| 2017/0296710 A9* | 10/2017 | Kulkarni | ............... | A61L 31/145 |
| 2017/0324729 A1* | 11/2017 | Hon | .................... | H04L 63/083 |
| 2017/0329966 A1* | 11/2017 | Koganti | ................ | G06F 21/554 |
| 2018/0004930 A1* | 1/2018 | Csinger | .................... | G06F 21/40 |
| 2018/0026796 A1* | 1/2018 | Oberheide | ............ | H04L 9/3247 713/176 |
| 2018/0047016 A1* | 2/2018 | Sarin | .................. | G06Q 20/3674 |
| 2018/0121636 A1* | 5/2018 | Schiffman | ............... | G06F 21/31 |
| 2018/0121655 A1* | 5/2018 | Abene | .................. | H04W 12/06 |
| 2018/0159847 A1* | 6/2018 | Dorfman | ............. | H04L 63/0823 |
| 2018/0332125 A1* | 11/2018 | Tang | .................... | G06K 7/1417 |

OTHER PUBLICATIONS

Venukumar, Vishnu, and Vinod Pathari. "Multi-factor authentication using threshold cryptography." Advances in Computing, Communications and Informatics (ICACCI), 2016 International Conference on. IEEE, 2016. (Year: 2016).*

* cited by examiner

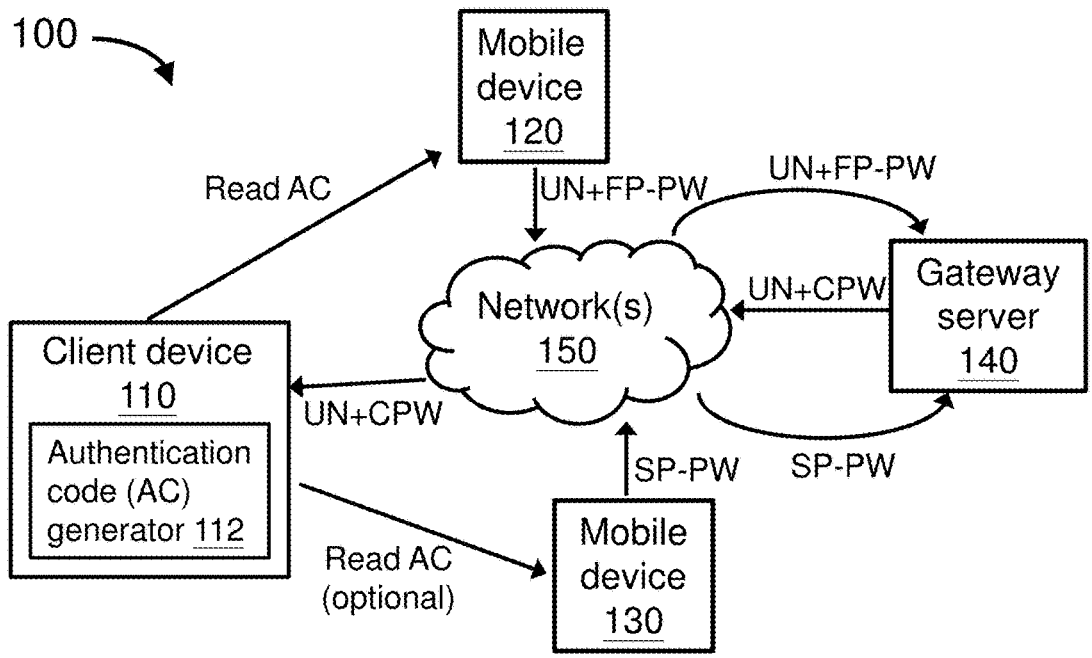

Figure 1

| Reading an authentication code displayed on a display of a client device to extract a Uniform Resource Locator (URL) and a first session identifier (ID) 202 |
|---|
| Searching a first account profile associated with the URL in a first account profile list 204 |
| Transmitting, when the first account profile associated with the URL is found in the first account profile list, the first session ID and the first account profile to a gateway server 206 |
| Prompting a second mobile device to provide a second part password to the gateway server 208 |
| Authenticating a user to login to a computer system with the client device when the client device retrieves from the gateway server a username and a complete password 210 |

Figure 2

METHODS AND APPARATUS FOR AUTHENTICATION OF JOINT ACCOUNT LOGIN

FIELD OF THE INVENTION

The present disclosure relates generally to information security, and more particularly to methods and apparatus for authentication of account login.

BACKGROUND

A joint or group account, such as a joint bank account, is shared by two or more individuals or owners. Each individual has his or her own username and password. When making a payment or withdrawing money from a joint bank account for example, each individual can access the joint bank account by providing his or her username and password that are verified at a payment or bank platform. During this process, the individual logins to his or her account by providing (such as typing with a keyboard) his or her login credentials (e.g. username and password) through a login interface of a computer device such as an insecure or untrusted device (e.g. a publicly shared computer).

New methods and apparatus that assist in advancing technological needs and industrial applications in account management and security are desirable.

SUMMARY

One example embodiment improves authentication of a user to login with a client device to a computer system. A mobile device reads an authentication code displayed on a display of the client device to extract a URL and a first session identifier (ID), searches a first account profile that includes a username and a first part password associated with the URL, transmits the first session ID and the first account profile to the gateway server, prompts a second mobile device to provide a second part password associated with the username to the gateway server to form a complete password, and authenticates the user to login to the computer system with the client device when the client device retrieves from the gateway server the username and the complete password.

Other example embodiments are discussed herein.

BRIEF DESCRIPTION OF THE DRAWINGS

FIG. 1 shows an authentication environment in accordance with an example embodiment.

FIG. 2 shows a flow chart illustrating an example method in accordance with an example embodiment.

DETAILED DESCRIPTION OF EMBODIMENTS

Figure 3:
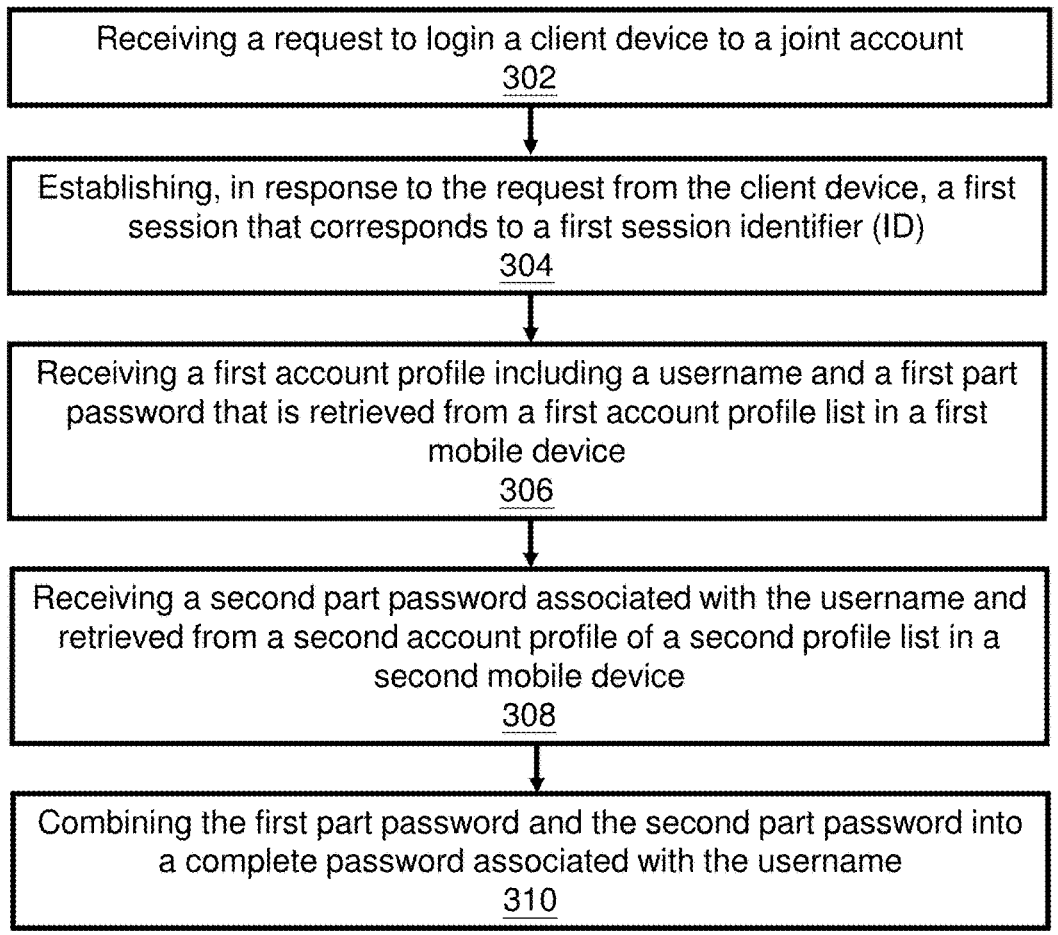
FIG. 3 shows a flow chart illustrating an example method in accordance with an example embodiment.

Example embodiments relate to methods and apparatus that improve account security.

In many scenarios, a joint or group account has two or more owners or holders with each having his or her own username and password to access the account. This situation is unsatisfactory when full trust has not been established between the owners and each owner is expected to own partial password or part of a password and is not allowable to access the account independently.

Furthermore, owners or users of a joint account frequently login to their account to access a website or other systems such as a bank system by providing (such as typing with a keyboard) their login credentials (e.g. usernames and passwords) through a login interface of an insecure or untrusted device (such as a publicly shared computer) or a device that is easy to be manipulated maliciously. An untrusted device may be implanted with or compromised by spyware such as key-logger spyware to steal users' credentials. Existing methods and systems also cannot identify and prevent hacking or fishing websites or systems that intend to illegally acquire sensitive information.

A further concern is, taking an automated teller machine (ATM) as an example, even if two or more owners or users of a joint account can input their own part of a password through an ATM interface, they are still exposed to risks that the password is stolen by a theft with a malicious camera installed secretly or with illegal manipulation of the ATM.

Example embodiments solve the above technical problems by providing technical solutions in new methods, apparatus, and systems that improve account security. Example embodiments improve security technologies by adopting an unconventional authentication process in which a server (such as a gateway server, an authentication server, or an application server) acts as a communication intermediary or tunnel that facilitates communication between a client device and two or more mobile devices.

Example embodiments solve the above technical problems by providing technical solutions in which leakage of sensitive information such as user credentials is prevented or avoided because a resource location hosted by a computer system (such as a server in a bank) is verified as authentic or trustworthy before sensitive information is provided.

Example embodiments improve information security by avoiding inputting sensitive information directly at an untrusted device. User credentials associated with a joint account are pre-stored in two or more trustworthy mobile devices with each owned by a respective owner. When attempting to login to a joint account, two or more parts of a password are provided separately to a trustworthy server that acts as a secure intermediary in which a complete password is generated by combing the plurality of parts of the password and then retrieved by a client device for login.

Example embodiments solve the above technical problems by providing new technical solutions that are unconventional and satisfactory and favorable for scenarios in which owners of a joint account prefer to access the account only when all of the owners are acknowledged. Each party of two or more owners provides only their own part of a password to an independent server in which all parts of the password are combined into a complete or full password.

One example embodiment provides a client device with which a user attempts to login to a joint account. The client device generates an authentication code including a Uniform Resource Locator (URL) that uniquely indicates an account site or resource location (such as website) hosted by a computer system (e.g., a server in a bank). A first mobile device reads the authentication code to obtain the URL that is compared with one or more URLs stored in the first mobile device to check whether the URL is authentic. When such a URL is found, a username and a first part password associated with the URL are provided to a server, and a second mobile device is prompted to provide a second part password to the server that combines the two part passwords into a complete password that is fetched by the client device for login, FIG. 1 shows an authentication environment 100 in accordance with an example embodiment. The authentication environment 100 includes a client device or client side or terminal 110 that includes an authentication code generator 112, a mobile device or portable electronic device (PED) 120, a mobile device or PED 130, and a gateway server or authentication server 140. The client device 110, the mobile devices 120 and 130 communicate with the gateway server 140 via one or more networks 150.

By way of example, the authentication code generator 112 in the client device 110 generates an authentication code including a Uniform Resource Locator (URL) that uniquely indicates an account site or resource location (such as a website) hosted by a computer system (e.g., a transaction server in a bank). The mobile device 120 reads the authentication code to obtain the URL that is compared with one or more URLs stored in the mobile device 120. When such a same URL is found, which indicates the URL is authentic and trustworthy, a username (UN) and a first part password (FP-PW) associated with the URL are provided to the gateway server 140 via the one or more network(s) 150. Then the mobile device 130 is prompted to provide a second part password (SP-PW) to the gateway server 140 via the network(s) 150. The gateway server 140 combines the two part passwords into a complete or full password (CPW). The client device 110 fetches or retrieves the username and the complete password for login.

In some example embodiments, a same URL is not found in the mobile device 120, which indicates the URL is new or has a possibility of being unauthentic. If the user still decides to provide user credentials for login, the mobile device 130 reads the authentication code to extract information (e.g. URL information, session ID) for further process.

For illustratively purpose only, FIG. 1 shows two mobile devices (i.e. the mobile devices 120 and 130) and a password includes two parts (i.e. a first part password and a second part password). However, a person of ordinary skill in the art would appreciate that a joint account can have more than two owners with each having their own part of a password, and more than two mobile devices are applicable in that case. For example, a joint account can have three owners, four owners, five owners, etc. with each owner having his or her own part of a password. The separate passwords from the individual owners are combined to form a single, unique, complete password used to login to the website or account.

FIG. 2 shows a flow chart illustrating an example method in accordance with an example embodiment. The example method improves authentication of a user to login with a client device to a computer system (such as a computer network (e.g., a website hosted by a web server), a financial management system, a human resource management system, etc.).

The method as illustrated in FIG. 2 can be executed by a computer or an apparatus that incorporates a computer. For example, the method as illustrated in FIG. 2 can be executed by the mobile device 120 with reference to FIG. 1.

According to block 202, a mobile device reads an authentication code displayed on a display of a client device to extract a URL and a first session identifier (ID). For illustrative purpose only, the URL is a reference to a resource location to which a user attempts to login, and the first session ID identifies a first session (such as a one-time random session) that is established with the client device by a gateway server.

According to block 204, the mobile device searches a first account profile associated with the URL in a first account profile list. By way of example, the mobile device is a trusted device and stores the first account profile list that includes one or more first account profiles each associated with a URL. Each first account profile includes a URL and its associated or corresponding username and first part password. A first part password, for example, is part or portion of a complete password and thus is insufficient for login to an account with a username. To login to an account, one or more other parts of a password are required to combine with the first part password to form a complete or full password. URLs stored in the first account profile list are considered as authentic and trustworthy.

According to block 206, when the first account profile associated with the URL is found in the first account profile list, the first session ID and the first account profile are transmitted to the gateway server. By way of example, the first session ID is used to identify the first session by the gateway server such that the gateway server writes the username and the first part password into the first session.

According to block 208, a second mobile device is prompted to provide a second part password associated with the username to the gateway server. A second part password, for example, is part or portion of a complete password and thus is insufficient for login to an account with a username. By way of example, the second part password is provided such that in the gateway server, the first part password and the second part password are combined into a complete password associated with the username for login.

According to block 210, the user is authenticated to login to the computer system with the client device when the client device retrieves from the gateway server the username and the complete password. By way of example, the client device knows a status of the first session by constantly, continually, or periodically polling, and fetches or retrieves the username and the complete password once the complete password is generated.

In this manner, a computer system to which a user attempts to login is verified before user credentials are provided. The user credentials are stored in and provided by two trusted mobile devices and then provided to a secure gateway server, and this process improves security and avoids sensitive information leakage.

FIG. 3 shows a flow chart illustrating an example method in accordance with an example embodiment. The example method improves authentication of a client device that logins into a joint account. For example, the method as illustrated in FIG. 3 can be executed by the gateway server 140 with reference to FIG. 1.

According to block 302, a gateway server receives a request to login a client device to a joint account. For example, the request is activated by the client device by clicking or activating a bookmarklet embedded in a web browser and then is transmitted to the gateway server. By way of example, the joint account is hosted by a computer system such as a transaction server in a bank.

According to block 304, the gateway server establishes a first session (such as a one-time random session) that corresponds to a first session ID in response to the request from the client device. For example, the first session is established to help communication between the client device and a trusted mobile device that stores an account profile list. The first session corresponds to a unique session ID that identifies the first session. As an example, the first session ID is retrieved by the client device and together with a URL that links uniquely to a login resource hosted by the computer system. The first session ID is embedded into a computer-readable authentication code that is generated by the client device and is read by the trusted mobile device.

According to block 306, the gateway server receives from a first mobile device a first account profile including a username and a first part password that is retrieved from a first account profile list in the first mobile device. For example, upon receipt by the gateway server, the username and the first part password are stored or written into the first session. The gateway server waits for a second part password from a second mobile device to obtain a complete password associated with the username for login.

According to block 308, the gateway server receives a second part password associated with the username and retrieved from a second account profile of a second profile list in a second mobile device. For example, the second part password is stored together with the username associated with the URL in the second account profile list. For example, the second part password is pre-stored in the second mobile device together with the associated username and the URL. When prompted (either automatically or manually), the second mobile device retrieves and transmits the second part password to the gateway server.

According to block 310, the first part password and the second part password are combined into a complete password associated with the username. By way of example, the complete password together with the username can be fetched by the client device to login into a joint account.

Figure 4:
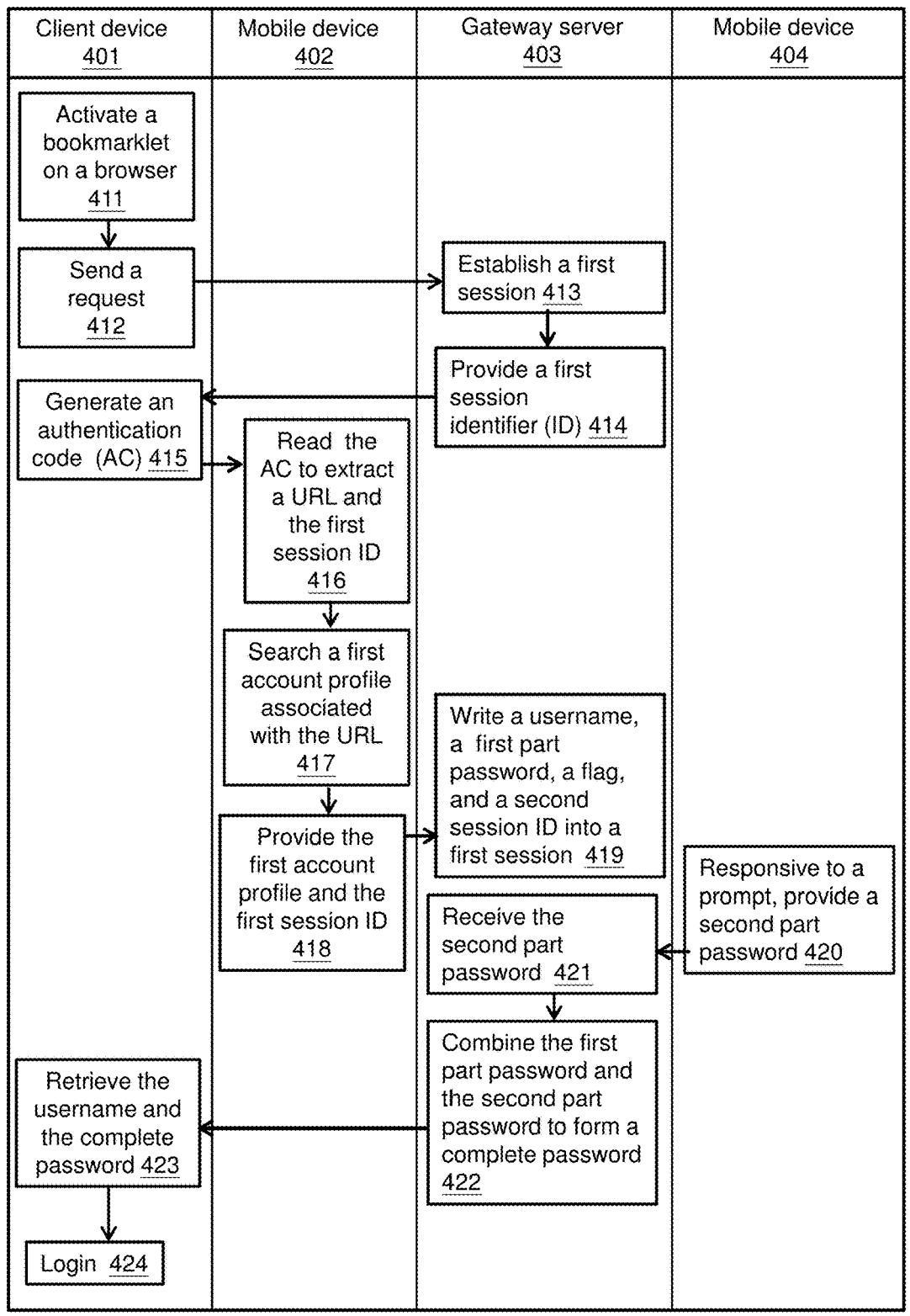
FIG. 4 shows a swim lane diagram illustrating an example method in accordance with an example embodiment.

FIG. 4 shows a swim lane diagram illustrating an example method in accordance with an example embodiment. The swim lane illustrates how a mobile device 402 (such as a smart phone) and a mobile device 404 authenticate a user to login with a client device 401 (such as a desktop computer, an ATM, etc.) to a computer system (using a web server hosting one or more websites as an example for illustrative purpose only in this example embodiment) through a secure gateway server 403 as a secure communication intermediary.

The mobile device 401 stores a first account profile list including one or more first account profiles. The mobile device 401 verifies whether a URL is authentic or trustworthy by determining whether the URL is stored in the first account profile list before providing corresponding a first part of user credentials (e.g. username and first part password) to the gateway server 403. The mobile device 404 stores a second account profile list including one or more second account profiles, and provides a second part of user credentials (e.g. username and second part password). The steps or mechanisms as shown in FIG. 4 is for illustrative purpose only, and a person of ordinary skill in the art would recognize various alterations and modifications that can implement example embodiments.

At block 411, when attempting to login to a website that presents a webpage with a unique URL, a user activates (e.g., opens with a mouse, touchpad, or voice command) a bookmarklet that is embedded into a web browser on the client device 401 to generate a request. At block 412, the request is sent to the gateway server 403. At block 413, upon receipt of the request, the gateway server 403 establishes a first session (e.g. a one-time random session) that helps communication between the mobile device 402 and the client device 401. Meanwhile, at block 414, the gateway server 403 assigns a first session ID that is used to identify the first session. Upon knowing the first session is established by polling status of the gateway server 403, at block 415, the client device 401 retrieves or fetches the first session ID from the gateway server 403 and generates an authentication code (e.g., a barcode or other machine readable code) that embeds information such as the first session ID and the URL.

At block 416, the mobile device 402 reads (e.g., images or scans with a camera) the authentication code to extract the URL and the first session ID. To verity the URL, at block 417, the mobile device 402 searches in its first account profile list to look for a first account profile that includes user credentials (e.g. username and password) associated with the URL or a joint account. When the first account profile associated with the URL is found, which indicates the URL is authentic, at block 418, the first account profile and the first session ID are provided to the gateway server 403. By way of example, the first account profile includes a username associated with the URL or the joint account, a first part password, a flag that indicates the account is a joint account and the first part password is not complete and one or more other parts of a password are required to be a complete password for login, and a second session ID that is associated with the username and is hardcoded into the mobile device 402. The second session is for example a long-lived or fixed session that is used to store a second part password from the mobile device 404 for a period of time. The second session ID is provided to the gateway server 403 such that the gateway server 403 knows from which session to fetch the second part password.

At block 419, the gateway server 403 write the username, the first part password, the flag, and the second session ID into the first session. By identifying the second session ID, the gateway server 403 constantly, continually, or periodically reads the status of the second session to monitor whether the second part password is ready or written in.

At block 420, responsive to a prompt, the mobile device 404 provides the second part password to the gateway server 403. By way of example, the mobile device 404 stores a second account profile list including one or more second account profiles. Each second account profile includes a URL, a username and a second part password, and a second session ID associated with the URL. The second session ID together with the second part password is sent to the gateway server 403 such that the gateway server 403 knows into which session the second part password is written by identifying the second session ID. By way of example, the action of prompting the mobile device 404 to provide the second part password can be done automatically (e.g., by sending a reminder automatically from the mobile device 402) or manually (e.g., by making a phone call or other form of communication to the owner of the mobile device 404 from the owner of the mobile device 402 such that the owner of the mobile device 404 opens a user authentication application on the mobile device 404 to provide the second part password). At block 421, the gateway server 403 receives the second part password. For example, the second part password is received and stored in the second session. At block 422, the gateway server 403 combines the first part password and the second part password to form a complete password. For example, when finding the second part password is written into the second session, the gateway server 403 fetches the second part password from the second session and writes it into the first session to combine with the first part password. After the complete password is generated, the flag stored in the first session is removed to indicate the password is complete.

At block 403, the client device 401 knows the complete password is ready by consistently, continually, or periodically polling the status of the first session of the gateway server 403, and fetches the username and the complete password such that the user is authenticated to login to the website.

Figure 5:
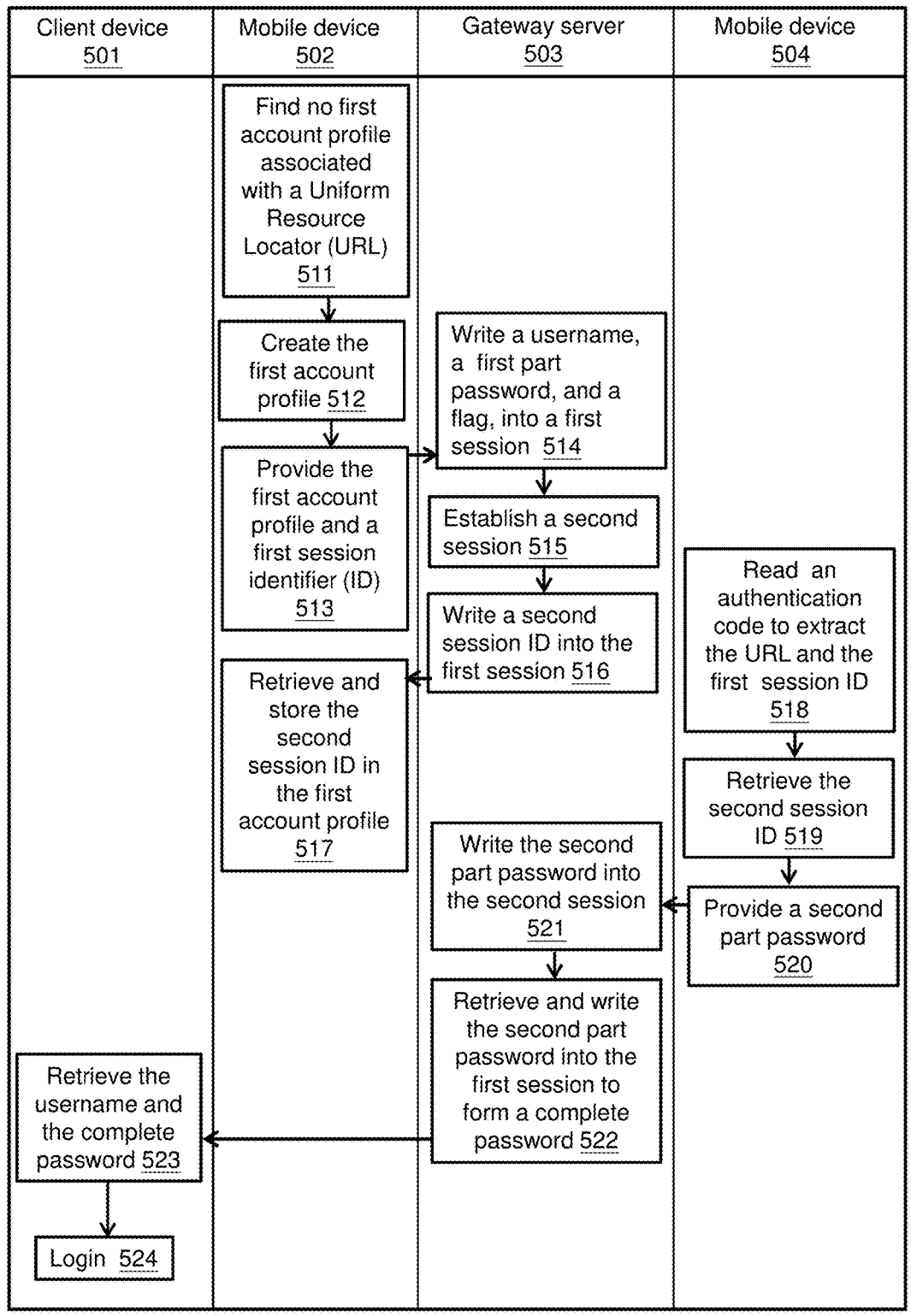
FIG. 5 shows a swim lane diagram illustrating an example method in accordance with an example embodiment.

FIG. 5 shows a swim lane diagram illustrating an example method in accordance with an example embodiment. The example embodiment begins with a scenario in which a first account profile associated with a URL is not found in a first account profile list in the mobile device 502. The mobile device 502 already knows a first session ID and the URL by reading an authentication code generated by the client device 501.

At block 511, a first account profile associated with a URL is not found by searching in a first account profile list in the mobile device 502. At block 512, the mobile device 502 creates a first account profile associated with the URL. For example, the mobile device 502 activates (e.g., clicking or commanding by a user) a button or trigger on its user interface to indicate a choice or decision to create the first account profile to be included in the first account list. As an example, to create a first account profile, the user or owner of the mobile device 502 inputs a username, a first part password, as well as a flag that indicate the inputted credentials correspond to a joint account and one or more other parts of a password are required to be provided from one or more other individuals. The first account profile is stored in the first profile list of the mobile device 502.

At block 513, the mobile device 502 provides or transmits the first session ID, the username, the first part password, and the flag to the gateway server 503. At block 514, the gateway server 503 identifies the first session with the first session ID and writes the first session ID, the username, the first part password, and the flag into the first session. With the flag, the gateway server 503 knows the account to which the user attempts to login is a joint account and a second part password is required. At block 515, the gateway server 503 establishes a second session that corresponds to a second session ID. For example, the second session is a long-lived or fixed session that is stored or hardcoded into the mobile device 504. For example, the second session is a long-lived session that is uniquely associated with the URL or the joint account. At block 516, the gateway server 503 writes the second session ID into the first session. At block 517, by constantly polling the status of the first session, the mobile device 502 retrieves the second session ID from the gateway server 503 and stores the second session ID into the first account profile associated with the URL.

At block 518, the mobile device 504 reads the authentication code generated by the client device 501 to extract the URL and the first session ID. By knowing the first session ID, at block 519, the mobile device 504 retrieves the username and the second session ID from the first session and stores the username and the second ID into a second account profile of a second account profile list in the mobile device 504. At block 520, the mobile device 504 provides the second part password by manually inputting the second part password for example.

At block 521, upon receipt of the second part password together with the second session ID transmitted by the mobile device 504, the gateway server 503 writes the second part password into the second session. At block 522, the gateway server 503 retrieves or fetches the second part password from the second session and writes the second part password into the first session in which the first part password and the second part password is combined into a complete password. For example, the gateway server 503 removes the flag from the first session indicating the password is complete. For example, alternatively and optionally, a second flag is transmitted together with the second session ID and the second part password from the mobile device 504, where the second flag provides an indication to the gateway server 503 suggesting no other part of password is required once the second part password is received.

At block 523, the client device 501 knows the user credentials are ready by consistently, continually, or periodically polling status of the gateway server 503, and fetches the username and the complete password such that the user is authenticated to login to the website at block 524.

Alternatively and optionally, when the first account profile associated with the URL is not found at block 511, a request is generated at the mobile device 502 and transmitted to the gateway server 503. Upon receipt of the request from the mobile device 502, the gateway server 503 searches the URL in a blacklist stored in the gateway server 503. The blacklist stores one or more URLs. A URL is considered by users as fake or risky or untrustworthy when the URL is found in the blacklist. When the URL is found in the blacklist, the URL is regarded as a fake or risky URL, and the mobile device 502 denies the user to login to the website at the client device 501. As an example, a denial message is generated at the mobile device 502 and further retrieved by the client device 501 through the gateway server 503 such that the user is denied to login to the website with the client device 501.

Alternatively and optionally, each URL in the blacklist of the gateway server 503 is associated with a number of votes (or voting number) that indicates a number of users that consider the URL as fake. When the URL is found in the blacklist of the gateway server 503, the mobile device 502 determines whether the voting number associated with the URL exceeds a threshold. The mobile device 502 denies the user's login to the website when the voting number equals or exceeds the threshold and authorizes the user's login to the website when the voting number is less than the threshold. In an example embodiment, the threshold is 30. When the mobile device 502 determines from a return result of searching in the blacklist that the voting number is 43 indicating 43 users considering the URL fake, the mobile device 502 denies the user login to the website with the client device.

Alternatively and optionally, when the URL is not found in the blacklist, the mobile device 502 decides whether to allow the user to login to the website with the client device 501. In an example embodiment, the mobile device 502 considers the URL new and considers the login as a first-time login, and blocks 512-524 are conducted as stated above.

Alternatively and optionally, when the first account profile associated with the URL is not found at block 511, the mobile device 502 does not request the gateway server 503 to search the URL in the blacklist, and instead, the mobile device 502 denies the user to login to the website with the client device 501. This can be done automatically or manually by activating a trigger (such as a button) of the mobile device 502 by the user.

Alternatively and optionally, when the first account profile associated with the URL is not found at block 511, a voting on the URL is conducted at the mobile device 502 to generate a counter value that is associated with the URL. The URL and the counter value are transmitted to the gateway server 503 that writes the URL and the counter value into a blacklist of the gateway server 503, where the counter value increments a voting number of the URL in the blacklist by one, and the voting number indicates a number of users that consider the URL as fake. Generation of a counter value at the mobile device 502 can be done automatically or manually by activating a counter button on a user interface of the mobile device 502 by the user. Alternatively and optionally, by way of example, the voting can be done after searching the URL in the blacklist of the gateway server 503.

Alternatively and optionally, the mobile device 502 generates a timestamp to add another layer of security such that the mobile device 502 is only allowed to login the client device 503 to the website during a specified period (such as in May 2017).

Alternatively and optionally, the mobile device 502 generates a geographical indicator to add another layer of security such that the mobile device 502 is only allowed to login the client device 502 to the website within a geographical boundary (e.g., only when the mobile device 502 is located within Macau).

Alternatively and optionally, the mobile devices 502 and 504 read the authentication code by receiving, through a microphone in the mobile devices 502 and 504 respectively, a sound that is played by the client device 501 to indicate the authentication code, and determining the authentication code from the sound.

Alternatively and optionally, before transmitting the data such as username, password, flag, and session ID to the gateway server 503 from one or more mobile devices (e.g., the mobile devices 502 and 503), the one or more mobile devices encode and encrypt (such as using Advanced Encryption Standard (AES) 256 and RAS, etc.) the data.

Upon retrieval of the data from the gateway server, the encoded and encrypted data are decoded and decrypted at the client device 501 for login.

Figure 6:
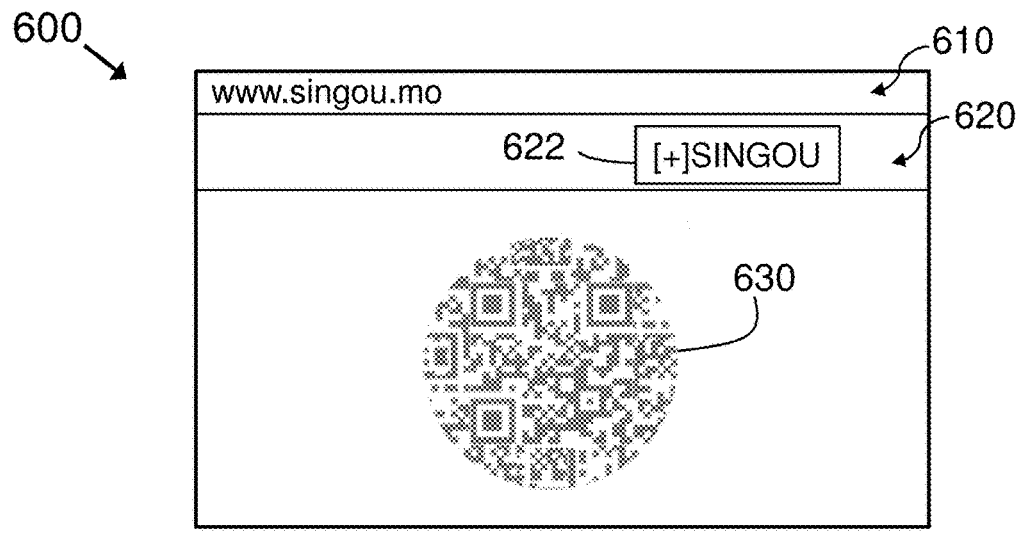
FIG. 6 shows a graph illustrating a login interface at a client device in accordance with an example embodiment.

FIG. 6 shows a graph illustrating a login interface 600 at a client device in accordance with an example embodiment. The client device, for example, is the client device 110, the client device 401, or the client device 501 as stated above.

The login interface 600 (e.g. browser interface) includes a column 610 that displays a webpage (e.g., "www.singou.mo") corresponding to a unique URL, a bookmark column 620 that includes a bookmarklet 622 (shown as "[+]SINGOU"), and an authentication code 630 (shown as a QR code) that is generated upon retrieval of a first session ID from a gateway server. The authentication code 630 includes information such as a first session ID and the URL that are to be obtained by a mobile device when reading (e.g. scanning with a camera) the authentication code 630.

Figure 7:
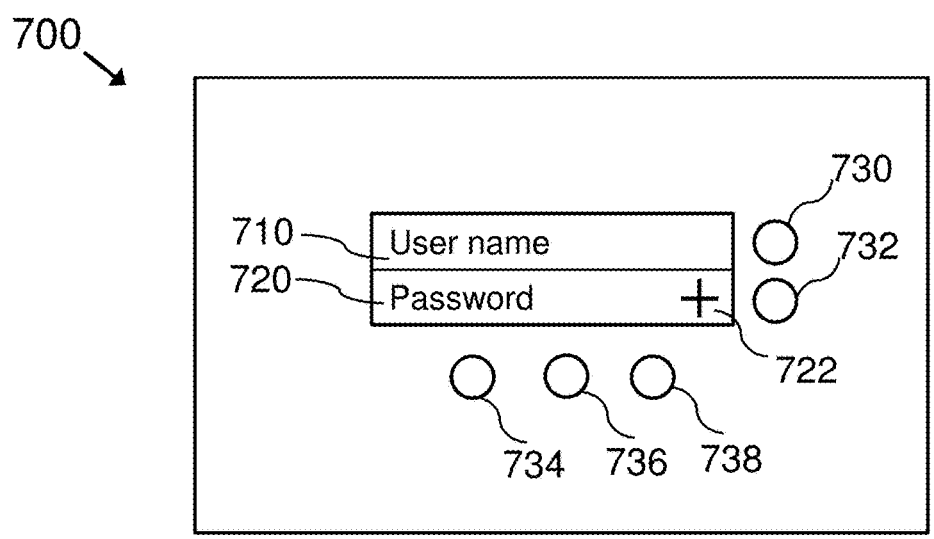
FIG. 7 shows a graph illustrating a user interface at a mobile device in accordance with an example embodiment.

FIG. 7 shows a graph illustrating a user interface 700 at a mobile device in accordance with an example embodiment. The mobile device, for example, is the mobile device 120, the mobile device 402, or the mobile device 502. For example, the user interface 700 is an interface of a user authentication application installed in the mobile device.

The user interface 700 includes a block 710 for inputting or writing a username, a block 720 for inputting or writing a first part password, and one or more triggers or buttons 730, 732, 734, 736, and 738.

The one or more buttons perform a variety of functions. For example, when no first account profile associated with the URL is found, activation of the button 730 indicates a username and a password can be input manually into blocks 710 and 720 respectively. In response to activation of the button 732, a flag 722 is generated indicating user credentials to be inputted correspond to a joint account. In response to activation of the button 734, the mobile device stores one or more of a URL, a username and a first part password associated with the URL and a flag into the first account profile list in the mobile device. In response to activation of the button 736, the mobile device denies login to a computer system. In response to activation of the button 738, the mobile device generates a counter value associated with a URL for voting the URL.

Figure 8:
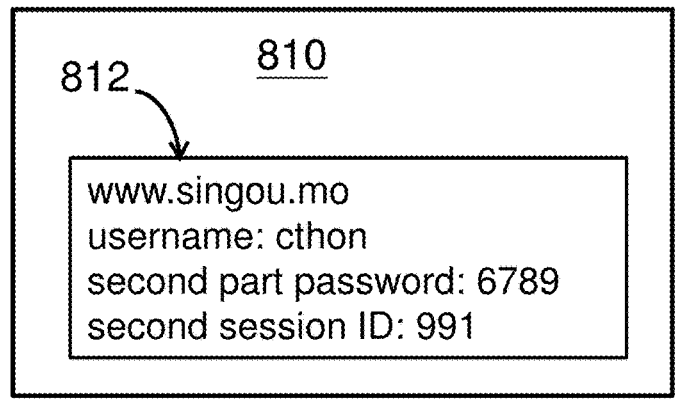
FIG. 8 shows a graph illustrating a second account profile list in a mobile device in accordance with an example embodiment.

FIG. 8 shows a graph illustrating a second account profile list 812 in a mobile device in accordance with an example embodiment. For example, the mobile device is the mobile device 130, the mobile device 404, or the mobile device 504 as stated above.

As shown, the second account profile list 810 includes a second account profile 812 that includes a URL (e.g. www.singou.mo), a username (e.g. "cthon"), a second part password (e.g. "6789"), and a second session ID (e.g. "991"). When prompted or requested, the second session ID and the second part password can be provided to a gateway server such that a complete password is generated in the gateway server.

Figure 9:
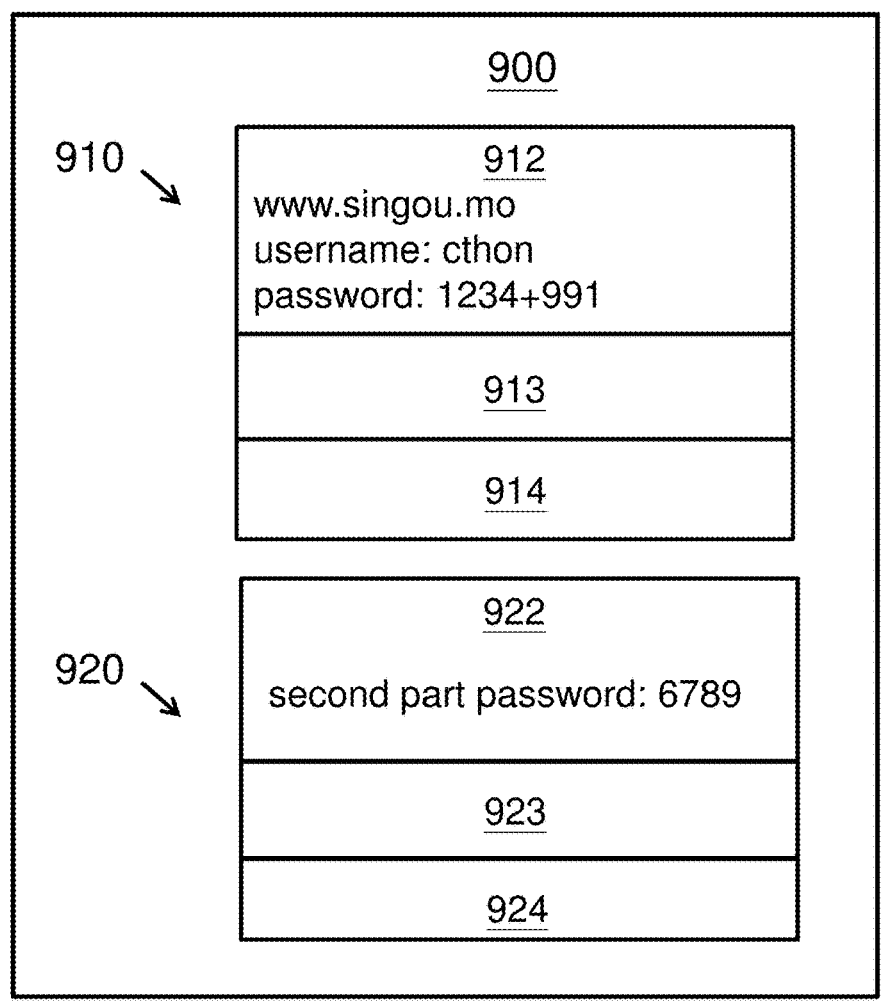
FIG. 9 shows a graph illustrating a table storing session data in gateway server in accordance with an example embodiment.

FIG. 9 shows a graph illustrating a table 900 storing session data in a gateway server in accordance with an example embodiment. For example, the gateway server is the gateway servers 140, the gateway server 403, or the gateway server 503 as stated above.

For illustrative purpose only, the table 900 includes a first area 910 and a second area 920. The first area 910 stores three sets of session data or blocks 912, 913, and 914 corresponding to three first sessions respectively. The second area 920 stores three sets of session data or blocks 922, 923, and 924 corresponding to three second sessions. For example, a second session corresponding to block 922 has a session ID of 991.

By way of example, in the block 912, "www.singou.mo" is a URL, "cthon" is a username. For "1234+991", "1234" represents a first part password. "+" is a flag that indicates a second part password is required to form a complete password. "991" represents a second session ID. When identifying the flag "+", the gateway server knows the password in the first session corresponding to 912 is not complete. By identifying the second session ID "991", the gateway server constantly reads status of the second session with the ID of "991". When the gateway server finds a second part password (e.g. "6789") is written into the second session, the gateway server fetches the second part password and writes the second part password into the first session corresponding to block 912 such that the password in the block 912 becomes "12346789". The flag and the second session ID are then removed from the first session. In an example embodiment, the second part password is removed or cleared after it is fetched by the gateway server.

Figure 10:
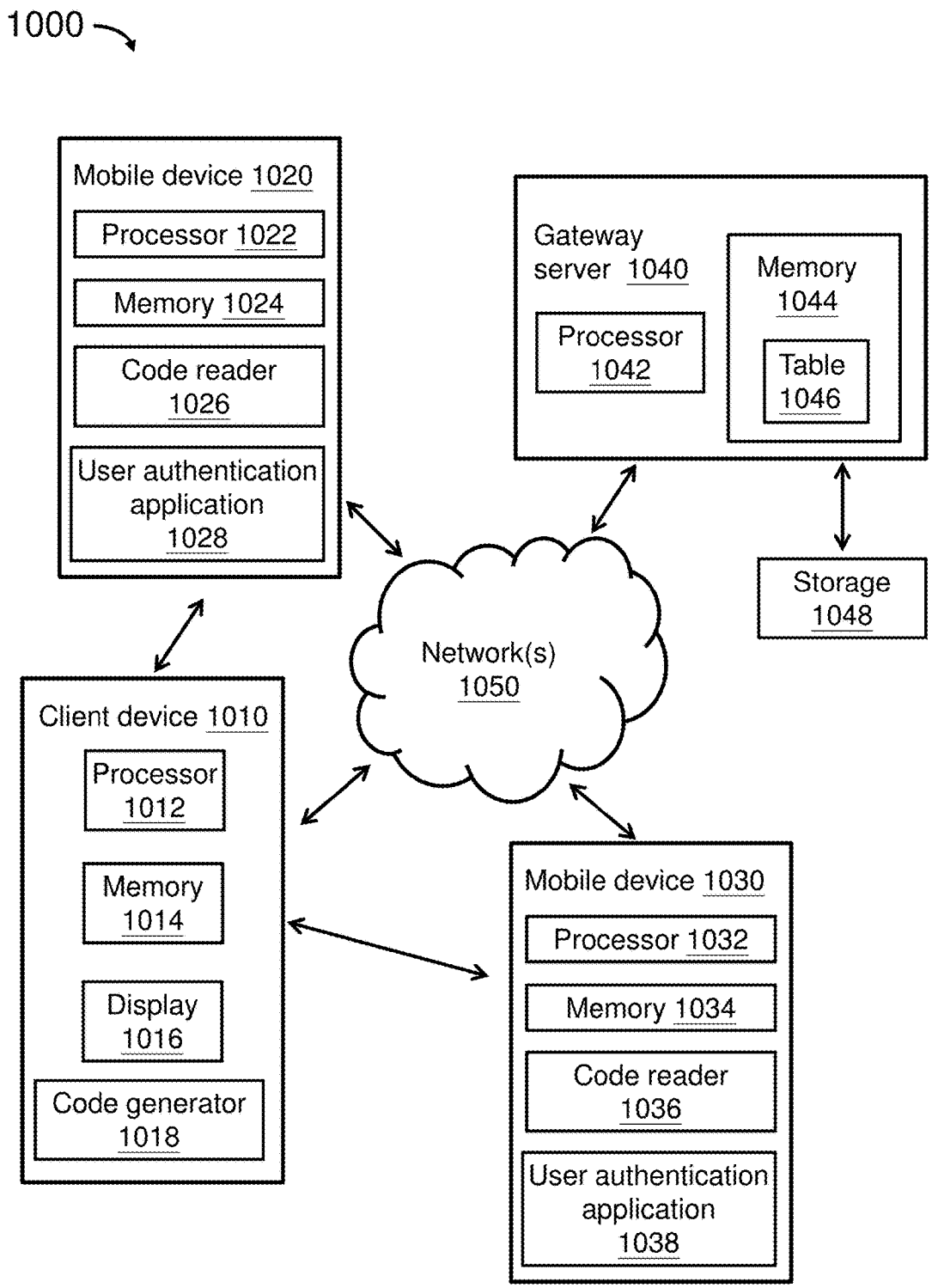
FIG. 10 shows a graph illustrating an authentication system in accordance with an example embodiment.

FIG. 10 shows a graph illustrating an authentication system 1000 in accordance with an example embodiment. The authentication system 1000 executes one or more example methods at stated herein. For example, the authentication system 1000 executes one or more example methods as stated with reference to FIGS. 2-5.

The authentication system 1000 includes a client device or client terminal 1010, a mobile device 1020, a mobile device 1030, and a gateway server 1040. The client device 1010, the mobile devices 1020 and 1030 communicate with the gateway server 1040 via one or more networks 1050.

The client device 1010 includes a processor or processing unit 1012 (such as one or more processors, microprocessors, and/or microcontrollers), one or more components of computer readable medium (CRM) or memory 1014, a user interface (such as a display) 1016, and a code generator 1018. The memory 1014 stores instructions or software that when executed cause the processor 1012 to execute one or more methods or functions implemented at the client device 1010. The code generator 1018 generates an authentication code that is displayed by the display 1016.

The gateway server 1040 includes a processor or processing unit 1042 (such as one or more processors, microprocessors, and/or microcontrollers), one or more components of computer readable medium (CRM) or memory 1044. The memory 1044 stores instructions or software that when executed cause the processor 1042 to execute one or more methods or functions implemented at the gateway server 1040, such as example methods as stated with reference to FIG. 3 and one or more blocks executed by a gateway server with reference to FIGS. 4-5. In an example embodiment, the memory 1044 includes a table 1046 that stores one or more session data (such as one or more session IDs, etc. as stated above).

In an example embodiment, the gateway server 1040 includes one or more non-transitory storage devices or storage 1048. Without limitation, the storage 1048 can be local and/or network accessible storage, which includes, but not limited to, a disk drive, a drive array, an optical storage device, a solid-state storage device, such as a random access memory (RAM), a read-only memory (ROM), which can be programmable, or flash-updateable, etc. As an example, the storage 1048 implements appropriate data stores such as various file systems, and database structures etc.

Alternatively and optionally, the storage 1048 is separate from the gateway server 1040 (e.g. removable), or provided in an installation package such that the storage 1048 is used to program, configure, and/or adapt a general purpose computer with instructions/codes stored thereon. Alternatively, the storage 1048 communicates with the gateway server 1040 over one or more networks.

The mobile device 1020 includes a processor or processing unit 1022 (such as one or more processors, microprocessors, and/or microcontrollers), one or more components of computer readable medium (CRM) or memory 1024. The memory 1024 stores instructions or software that when executed cause the processor 1022 to execute one or more methods or functions implemented at the mobile device 1020, such as example methods as stated with reference to FIG. 2 and one or more blocks executed by the mobile devices 402 and 502 with reference to FIGS. 4-5. These instructions or software can take the form of executable code, which is executed by the processor 1022, and/or take the form of source and/or installable code, which, upon compilation and/or installation on the mobile device 1020 (e.g., using one of a variety of generally available compilers, installation programs, compression/decompression utilities, etc.) followed by taking form of executable code.

As shown, the mobile device 1020 includes a code reader 1026 that reads an authentication code provided by the client device 1010. As an example, the code reader 1026 is a scanner or cameral that scans a QR code displayed on the client device 1010 to extract information such as a session ID and a URL embedded in the QR code.

As shown, the mobile device 1020 further includes a user authentication application 1028 that when executed assists in executing one or more methods as stated above.

The mobile device 1030 includes a processor or processing unit 1032, one or more components of computer readable medium (CRM) or memory 1034, a code reader 1036, and a user authentication application 1038.

Figure 11:
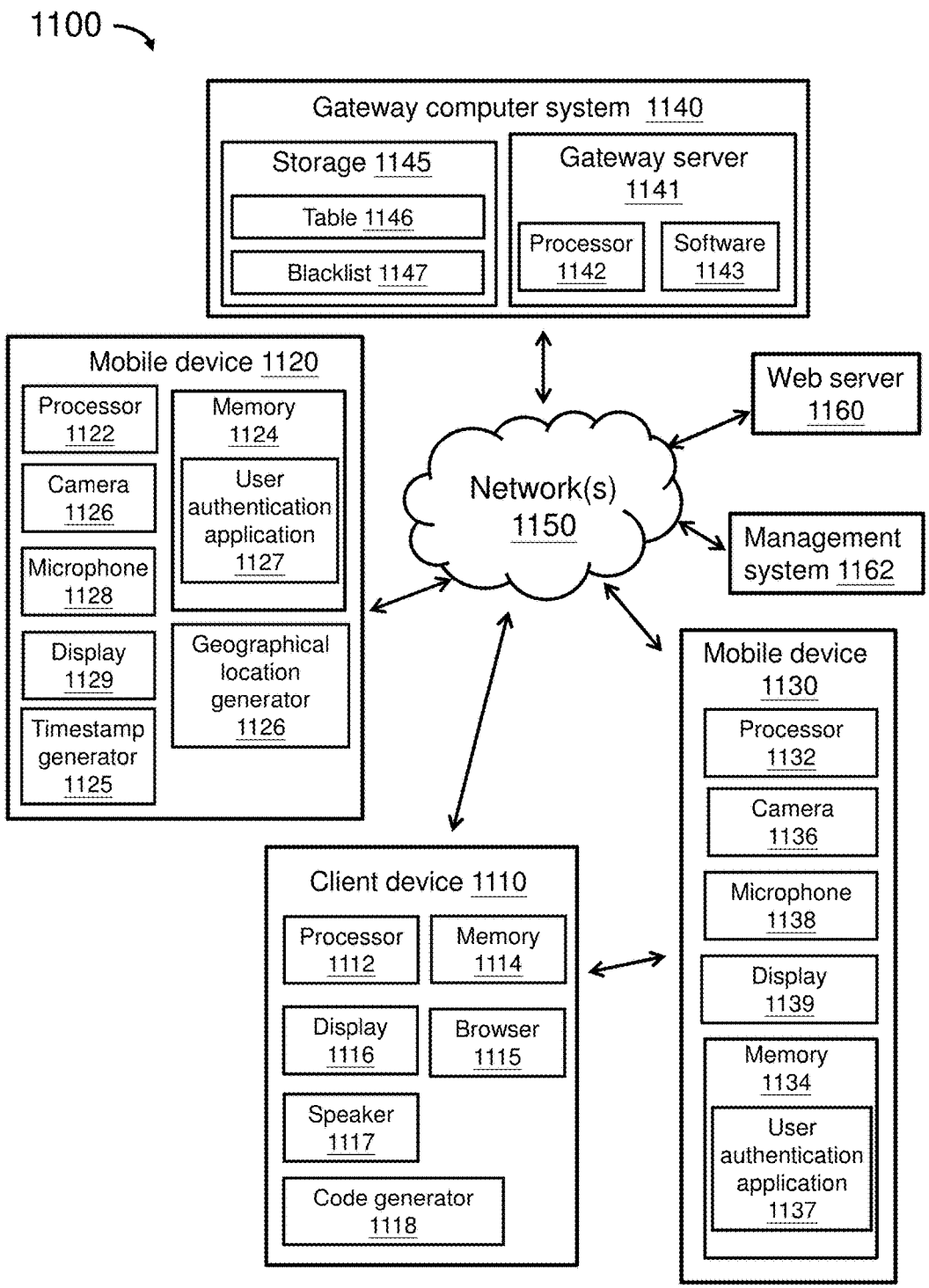
FIG. 11 shows a graph illustrating an authentication system in accordance with an example embodiment.

FIG. 11 shows a graph illustrating an authentication system 1100 in accordance with an example embodiment. The authentication system 1100 executes one or more example methods at stated herein. For example, the authentication system 1100 executes one or more example methods as stated with reference to FIG. 2-5.

As illustrated, the authentication system 1100 includes a client device 1110, a mobile device 1120, a mobile device 1130, a gateway computer system 1140, one or more networks 1150, a web server 1160, and a management system 1162.

The client device 1110 includes a processor 1112, a memory 1114, a browser 1115 that presents a login interface (e.g. webpage or management system login interface) of a resource (e.g. website hosted by the web server 1160, or a link page hosted by the management system 1162), a code generator 1118 that generates an authentication code such as a QR code, a display 1116 that displays the authentication code, and a speaker 1117 that plays sound to indicate the authentication code such that the authentication code is determined by the mobile device 1120 from the sound.

The gateway computer system 1140 includes a gateway server 1141 and storage 1145. The gateway server 1141 includes a processor 1142 and software 1143 that when executed causes the processor 1142 to execute one or more methods or functions implemented at the gateway server 1141 (such as example methods as stated with reference to FIG. 3 and one or more blocks executed by a gateway server with reference to FIGS. 4-5). The storage 1145 includes a table 1146 that stores information such as session data, and a blacklist 1147 that stores URLs that are considered as unsecure or fake and voting numbers that indicate how many users consider a URL as fake.

The mobile device 1120 includes a processor 1122 and a memory 1124 that stores a user authentication application 1127 that when executed causes the processor 1122 to execute one or more methods or functions implemented at the mobile device 1120.

As shown, the mobile device 1120 further includes a camera 1126 that scans an authentication code generated by the client device 1110, a microphone 1128 that captures or receives sound that is played by the client device 1510 to determine an authentication code generated by the client device 1110, a display 1129 that acts as an user interface on which a user performs various operations such as activating one or more buttons as stated with reference to FIG. 7.

Alternatively and optionally, as shown in FIG. 11, the mobile device 1120 includes a timestamp generator 1125 and a geographical location generator 1126. The timestamp generator 1125 creates a timestamp that indicate a period during which the mobile device 1120 is allowed to be used to authenticate a user to login with the client device 1110 to a computer system such as a web server 1160 and a management system 1162. The geographical location generator 1126 generates a geographical indicator that indicates a geographical boundary within which the mobile device 1120 is allowed to be used to authenticate a user to login with the client device 1110 to a computer system such as a web server 1160 and a management system 1162.

As shown in FIG. 11, the authentication system 1100 includes a mobile device 1130 that includes a processor 1132, a memory 1134 that includes a user authentication application 1137, a camera 1136, a microphone 1138, and a display 1139.

In some example embodiments, the methods illustrated herein and data and instructions associated therewith, are stored in respective storage devices that are implemented as non-transitory computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

The methods in accordance with example embodiments are provided as examples, and examples from one method should not be construed to limit examples from another method. Figures and other information show example data and example structures; other data and other database structures can be implemented with example embodiments. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

As used herein, "Uniform Resource Locator" or "URL" is a reference to a resource (e.g. a website hosted by a wet server, a use account hosted by an organization's management system, etc.) that specifies its location on a computer system (e.g. a computer network, a web server, a transaction server, an organization's management system) and a mechanism for retrieving the resource.

As used herein, "a first part password" is part or portion of a complete password and thus is insufficient to login to an account with a username. To login to an account, for example, one or more other parts of a password are required to combine with the first part password to form a complete or full password.

As used herein, "a second part password" is part or portion of a complete password and thus is insufficient to login to an account with a username. To login to an account, for example, one or more other parts of a password are required to combine with the second part password to form a complete or full password.

As used herein, "one-time random session" is using randomly generated numbers as session variables to identify a session that is used temporarily or within a specified period.

As used herein, a "blacklist" is a list in a gateway server and the list includes one or more URLs that are considered as untrustworthy or fake.

What is claimed is:

1. A method that improves authentication of a user to login with a client device to a computer system, the method comprising:

reading, by a first mobile device that stores a first account profile list, an authentication code displayed on a display of the client device to extract a Uniform Resource Locator (URL) and a first session identifier (ID) that corresponds to a first session established by a gateway server;

searching, by the first mobile device and in the first account profile list, a first account profile associated with the URL and including a username and a first part password associated with the username;

providing, at the first mobile device, the first account profile that includes a second session ID corresponding to a second session established by the gateway server and associated with the URL, and a flag indicating the first account profile corresponds to a joint account;

transmitting, by the first mobile device and when the first account profile associated with the URL is found in the first account profile list, the first session ID and the first account profile to the gateway server;

providing, by the first mobile device, the first account profile to the gateway server such that the gateway server knows the first account profile corresponding to the joint account by identifying the flag and fetches from the second session by identifying the second session ID the second part password provided by the second mobile device to generate a complete password for login;

prompting a second mobile device to provide a second part password associated with the username to the gateway server such that the gateway server combines the first part password and the second part password into a the complete password associated with the username; and authenticating the user to login to the computer system with the client device when the client device retrieves from the gateway server the username and the complete password.

2. The method of the claim 1, further comprising:

providing, at the second mobile device that includes a second account profile list, a second account profile that is associated with the URL and includes the second part password and the second session ID that corresponds to the second session established by the gateway server; and transmitting, by the second mobile device, the second part password and the second session ID to the second session of the gateway server such that the second part password is fetched by the gateway sever from the second session and written into the first session in which the second part password is combined with the first part password to form the complete password for login.

3. The method of the claim 1 further comprising:

scanning, with a camera in the first mobile device, the authentication code that is displayed on the display of the client device as a Quick Response (QR) code to extract the first session ID and the URL.

4. The method of the claim 1, further comprising:

creating, at the first mobile device and when the first account profile associated with the URL is not found in the first account profile list, the first account profile that includes the URL, the username and the first part password associated with the username, and the flag that indicates the first account profile corresponds to the joint account;

transmitting, by the first mobile device, the first session ID, the username, the first part password and the flag to the gateway server such that the gateway server knows the first account profile corresponds to the joint account with the flag and establishes the second session that corresponds to the second session ID;

retrieving, by the first mobile device and from the gateway server, the second session ID;

storing, by the first mobile device, the second session ID into the first account profile;

reading, by the second mobile device that stores a second account profile list, the authentication code displayed on a display of the client device to extract the URL and the first session ID;

retrieving, by the second mobile device and from the first session of the gateway server, the username and the second session ID;

creating, by the second mobile device, a second account profile that includes the URL, the username, the second part password, and the second session ID; and transmitting, by the second mobile device, the second session ID and the second part password to the second session of the gateway server such that the gateway sever fetches the second part password from the second session and combines the first part password and the second part password to form the complete password associated with the username.

5. The method of the claim 1, further comprising:
generating, by the first mobile device and when the first account profile associated with the URL is not found in the first account profile list, a request to the gateway server such that the gateway server searches the URL in a blacklist of the gateway server that stores one or more URLs;
determining, by the first mobile device and when the URL is found in the blacklist of the gateway server, whether a number of votes that indicate a number of users that consider the URL as fake exceeds a threshold; and
denying the client device access to the computer system when the number of votes exceeds the threshold.

6. The method of the claim 1, further comprising:
voting, on a user interface of the first mobile device and when the first account profile associated with the URL is not found in the first account profile list, the URL by activating a counter button to generate a counter value that is associated with the URL; and
transmitting, by the first mobile device, the URL and the counter value to the gateway server that writes the URL and the counter value into a blacklist of the gateway server,
wherein the counter value increments a voting number of the URL in the blacklist by one, and the voting number indicates a number of users that consider the URL as fake.

7. The method of the claim 1 further comprising:
receiving, at the client device, activation of a bookmarklet that executes a command to generate the authentication code as a machine readable barcode that is displayed to the first mobile device.

8. A method that improves authentication of a client device that logins into a joint account, the method comprising:

receiving, at a gateway server, a request to login the client device to the joint account;
establishing, by the gateway server and in response to the request from the client device, a first session that corresponds to a first session identifier (ID) such that the first session ID is retrieved by the client device to create a computer-readable authentication code that includes the first session ID and a Uniform Resource Locator (URL) that is provided by the client device for login into the joint account;
establishing, by the gateway server and responsive to receiving a flag from the first mobile device, a second session that corresponds to a second session ID;
writing, by the gateway server, the second session ID into the first session from which the second session ID is fetched by the first mobile device and the second mobile device;
receiving, by the gateway server and from a first mobile device, a first account profile including a username and a first part password that is retrieved from a first account profile list in the first mobile device;
receiving, by the gateway server and from a second mobile device, a second part password associated with the username and retrieved from a second account profile of a second profile list in the second mobile device; and
combining, by the gateway server, the first part password and the second part password into a complete password associated with the username such that the username and the complete password are fetched by the client device to login into the joint account.

9. The method of the claim 8, further comprising:
retrieving, by the gateway server, the second part password from the second session of the gateway server; and
writing, by the gateway server, the second part password into the first session to form the complete password with the first part password.

10. An authentication system that improves how users authenticate to a joint account hosted by a computer system, comprising:
a client device with a display that displays an authentication code;
a gateway server that includes a computer-readable medium (CRM) that stores session identifiers (IDs) corresponding to sessions that are established in response to requests from the client device;
a first mobile device that communicates with the gateway server over a network and includes:
a first memory that stores a first account profile list including one or more first account profiles; and
a first authentication reader that reads the authentication code from the display of the client device to obtain a first session ID and a URL that are embedded in the authentication code, wherein the first session ID corresponds to a first session that is established by the gateway server,
a second mobile device that communicates with the gateway server over the network and includes:
a second memory that stores a second account profile list including one or more second account profiles,
wherein the first mobile device searches a first account profile associated with the URL and including a username and a first part password associated with the username in the first account profile list;

wherein the first account profile includes a second session ID corresponding to a second session established by the gateway server and associated with the URL, and a flag indicating the first account profile corresponding to a joint account;

wherein the first mobile device transmits the first session ID and the first account profile to the gateway server when the first account profile associated with the URL is found in the first account profile list;

wherein the first mobile device provides the first account profile to the gateway server such that the gateway server knows the first account profile corresponding to the joint account by identifying the flag and fetches from the second session by identifying the second session ID the second part password provided by the second mobile device to generate a complete password to login;

wherein the second mobile device is prompted to provide a second part password associated with the username to the gateway server such that the gateway server combines the first part password and the second part password into the complete password associated with the username;

wherein the users is authenticated to login to the computer system with the client device when the client device retrieves from the gateway server the username and the complete password.

11. The authentication system of claim 10, wherein both the first account profile in the first mobile device and a second account profile in the second mobile device include the second session ID that corresponds to the second session established by the gateway server.

12. The authentication system of claim 10,
wherein the computer system is a web server that hosts a website, and the client device includes a web browser and a bookmarklet,
wherein the client device requests the gateway server to establish the first session in response to an activation of the bookmarklet, and
wherein the client device receives from the gateway server the first session ID that corresponds to the first session and embeds the first session ID and the URL into the authentication code that is generated by an authentication code generator that is included in the client device.

13. The authentication system of claim 10, wherein the second memory of the second mobile device includes instructions that when executed cause the second processor to:
retrieve, in response to a request to provide the second part password, a second account profile associated with the URL in the second account profile list; and
transmit the second session ID and the second password that are included in the the second account profile to the second session of the gateway server corresponding to the second session ID such that the second part password is fetched by the gateway server and written into the first session in which the second part password is combined with the first part password to generate the complete password.

14. The authentication system of claim 10, wherein the authentication code is a symbolic code, and wherein the first mobile device includes a camera that scans the authentication code to extract the first session ID.

15. The authentication system of claim 10, wherein the gateway server includes a blacklist that stores one or more URLs that are considered as fake.

* * * * *